US012317120B1

(12) United States Patent
Marupaduga (10) Patent No.: US 12,317,120 B1
(45) Date of Patent: May 27, 2025

(54) USE OF BACKHAUL PACKET-DROP RATE AS BASIS TO CONTROL TRANSPORT BLOCK SIZE FOR AIR-INTERFACE COMMUNICATION

(71) Applicant: T-MOBILE USA, Inc., Bellevue, WA (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 171 days.

(21) Appl. No.: 17/247,136

(22) Filed: Dec. 1, 2020

(51) Int. Cl.
*H04W 28/02* (2009.01)
*H04W 28/06* (2009.01)

(52) U.S. Cl.
CPC ....... *H04W 28/0252* (2013.01); *H04W 28/06* (2013.01)

(58) Field of Classification Search
None
See application file for complete search history.

(56) References Cited

U.S. PATENT DOCUMENTS

| | | | |
|---|---|---|---|
| 9,294,220 B2 | 3/2016 | Brannstrom et al. | |
| 9,723,570 B2 | 8/2017 | Lou et al. | |
| 10,154,515 B1 | 12/2018 | Oroskar et al. | |
| 10,285,167 B2* | 5/2019 | Chen | H04L 5/0053 |
| 11,218,243 B2* | 1/2022 | Chen | H04L 1/0016 |
| 2011/0310987 A1* | 12/2011 | Lee | H04W 52/146 375/259 |
| 2013/0051332 A1* | 2/2013 | Sridhar | H04W 48/06 455/450 |
| 2017/0099327 A1* | 4/2017 | Negalaguli | H04L 1/0015 |
| 2018/0019856 A1* | 1/2018 | Wang | H04L 5/0044 |
| 2018/0054757 A1* | 2/2018 | Nanri | H04L 1/00 |
| 2018/0279229 A1* | 9/2018 | Dinan | H04W 72/21 |
| 2019/0089511 A1* | 3/2019 | Saito | H04W 28/06 |
| 2020/0112948 A1* | 4/2020 | Wang | H04W 72/12 |
| 2020/0252847 A1* | 8/2020 | Park | H04W 76/27 |
| 2020/0280394 A1* | 9/2020 | Sarkis | H04L 1/0058 |
| 2020/0366317 A1* | 11/2020 | Myung | H03M 13/618 |
| 2021/0215830 A1* | 7/2021 | Sahlin | G08G 1/162 |
| 2021/0274381 A1* | 9/2021 | Teyeb | H04L 1/1854 |
| 2021/0337428 A1* | 10/2021 | Li | H04W 72/0446 |
| 2021/0377116 A1* | 12/2021 | Yeh | H04W 24/10 |

(Continued)

FOREIGN PATENT DOCUMENTS

| | | | | |
|---|---|---|---|---|
| WO | WO-2016090607 A1 * | 6/2016 | | H04L 1/00 |
| WO | WO-2017030481 A1 * | 2/2017 | | H04L 63/0485 |
| WO | WO-2017175818 A1 * | 10/2017 | | H04L 1/0007 |

(Continued)

*Primary Examiner* — Wutchung Chu
*Assistant Examiner* — Berhanu D Belete
(74) *Attorney, Agent, or Firm* — Lee & Hayes, P.C.

(57) ABSTRACT

A method and system to control transport block size (TBS) that a user equipment device (UE) served by an access node will use for uplink air-interface transmission from the UE to the access node, the TBS defining a quantity of data that the UE will provide in the uplink air-interface transmission. An example method includes (i) determining a rate of uplink backhaul packet loss of the backhaul interface and (ii) using the determined rate of uplink backhaul packet loss as a basis to control what TBS the UE will use for the uplink air-interface transmission.

20 Claims, 4 Drawing Sheets

(56) References Cited

U.S. PATENT DOCUMENTS

2022/0015125 A1\* 1/2022 Liu ...................... H04W 72/23

FOREIGN PATENT DOCUMENTS

| WO | WO-2017193315 A1 \* | 11/2017 | ............. G10L 19/00 |
| WO | WO-2018084202 A1 \* | 5/2018 | ......... H04L 63/0485 |
| WO | WO-2019015758 A1 \* | 1/2019 | ......... H04L 63/0485 |
| WO | WO-2021109792 A1 \* | 6/2021 | ........... H04L 1/0003 |

\* cited by examiner

USE OF BACKHAUL PACKET-DROP RATE AS BASIS TO CONTROL TRANSPORT BLOCK SIZE FOR AIR-INTERFACE COMMUNICATION

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. And the coverage provided by a given access node on a given carrier could be considered to define a respective "cell".

Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink channels, the coverage of each cell could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals, reference signals, system information, and other control signaling such as PRB-scheduling directives and acknowledgement messaging from the access node to UEs. And on the uplink, certain resource elements could be reserved to carry random-access signals and other control signaling such as PRB-scheduling requests, acknowledgement 10 messaging, and channel-quality reports from UEs to the access node.

OVERVIEW

When a UE enters into coverage of an example network, the UE could detect threshold strong coverage of an access node's cell (e.g., a threshold strong reference signal broadcast by the access node in that cell) and could then engage in random-access and Radio Resource Control (RRC) signaling to establish an RRC connection through which the access node will serve the UE in that cell.

Further, if the UE is not already registered for service with the core network, the UE could transmit to the access node an attach request, which the access node could forward to a core-network controller for processing. And the core-network controller could then coordinate setup for the UE of one or more user-plane bearers extending between the UE and a core-network gateway that provides connectivity with a transport network. Further, in relation to the UE's attachment, the core-network gateway or an associated server could assign to the UE an Internet Protocol (IP) address to enable the UE to engage in packet-data communication on the transport network.

Once the UE is so connected and registered, the access node could then serve the UE in a connected mode on the carrier, managing downlink air-interface communication of packet data to the UE and uplink air-interface communication of packet data from the UE.

For instance, when the core-network gateway receives user-plane data for transmission to the UE, the data could flow through the core network to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs, and the access node could forward that data through the core network to core-network gateway for output onto the transport network.

For each such scheduled downlink or uplink communication on PRBs between an access node and a UE, the access node and UE could use a modulation and coding scheme (MCS) that is selected based on the UE's wireless channel quality. In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with more error-correction coding) and/or that supports more bits per resource element, and when channel quality is worse, the access node may direct use of a lower-order MCS that may have a lower coding rate and/or supports fewer bits per resource element.

A representative system could support a range of such MCSs, from very low order to very high order. And the access node could determine the MCS to be used in a given instance based on wireless channel quality reported by the UE. For instance, as the access node serves the UE, the UE could transmit channel quality reports to the access node periodically and/or as part of the UE's scheduling requests or other communications to the access node, with each report including a channel-quality indicator (CQI) value representing the UE's determined channel quality and perhaps one or more other channel metrics such as downlink reference signal receive power (RSRP), signal-to-interference-plus-noise ratio (SINR), or the like. When the access node schedules communications to or from the UE, the access node could then map the UE's latest reported CQI value to a corresponding MCS value using a standard CQI-MCS mapping table, and the access node could direct use of that MCS in the scheduling directive that the access node sends to the UE. Communication could thus occur using that directed MCS.

In addition, for each such scheduled downlink or uplink communication on PRBs between an access node and a UE, the transport block size (TBS) could be determined based at least on the number of allocated PRBs and the assigned MCS that will be used for transmitting the transport block. For instance, the access node and UE could each refer to one or more standard mapping tables that map the MCS and number of PRBs cooperatively to a TBS, such as by mapping the MCS to a TBS index and then mapping that TBS index, for the designated number of PRBs, to a respective number of bits defining the TBS. The transmitting entity (UE or access node) could then accordingly transmit that number of bits to the receiving entity (access node or UE) in the designated PRBs.

This or another such wireless communication system could enable a UE to engage in data communication with a remote entity via the UE's air-interface connection, the core network, and the transport network. For instance, data communication from the UE to a remote entity via the transport network could flow from over the air from the UE to the access node, then through the core network from the access node to a gateway, and through the transport network from the gateway or an associated firewall to the remote entity. Further, communication may also occur directly via the core network between wirelessly connected devices, e.g., with the remote entity being another device accessible via the core network.

For most forms of communication between two devices, each device may implement a protocol stack that defines a sequence of logical processing layers, ranging from an application layer down to a physical layer (such as a physical cellular air-interface). In practice, the transmitting device could process the data in successive layers down the stack, ultimately outputting the result for transmission over the physical layer to the receiving device. And upon receipt of the data at the physical layer, the receiving device could then then process the data at successive layers up through the stack, reversing the per-layer processing carried out by the transmitting device so as to ultimately uncover the transmitted data.

Representative layers of such a protocol stack for communication between a UE and a remote entity via the transport network could include an application layer, a transport layer, and a network layer. The application layer could be the ultimate source and destination of the data being communicated, such as data generated by a user-plane application running on the transmitting entity, to be received by a user-plane application running on the receiving entity. The transport layer could implement the Transmission Control Protocol (TCP), a connection-oriented protocol that includes flow control to facilitate acknowledgement and retransmission. And the network layer could implement the Internet Protocol (IP) to facilitate routing packets from a source network address to a destination network address.

For instance, when the UE has application-layer data to send to a remote entity via the transport network, the UE could process successive segments of the data at the transport layer to produce TCP packets each having a TCP header specifying source and destination TCP port numbers and a TCP sequence numbers. Further, the UE could process each TCP packet at the network layer to produce a respective IP packet by adding to each TCP packet an IP header specifying the UE's IP address as source address and the remote entity's IP address as destination address. And the UE could transmit the IP packets over the air to the UE's serving access node, the access node could forward the IP packets into the core network, and the core-network gateway (or an associated firewall or the like) could output the IP packets onto the transport network for transmission to the remote entity.

The wireless communication of each such IP packet between the UE and the access node could also implement a protocol stack. In an example implementation, for instance, the UE could process each such IP packet a Packet Data Convergence Protocol (PDCP) layer, applying robust header compression (RoHC) that may replace various packet headers with a smaller RoHC header and/or otherwise process IP packets to produce PDCP data units. And the UE could process each PDCP data unit through one or more link layers, such as a Radio Link Protocol (RLP), adding an RLP header, and a Media Access Control (MAC) layer, adding a MAC header. The output of the MAC layer as to one or more such IP packets could then be a sequence of bits that could be form the transport blocks for transmission over the air as noted above.

Upon receipt of one or more such transport blocks from the UE, the access node could then reverse the processing of the MAC, RLP, and PDCP layers, to uncover the IP packets. And the access node could then forward the IP packets into the core network for the core-network gateway to output onto the transport network, to facilitate transmission to the remote entity as noted above.

One technical problem that can arise in this or another such communication system is that IP packets could be lost (e.g., dropped) while en route from the UE to a remote entity. By way of example, this packet loss could occur in a backhaul connection through which the access node interfaces with the core network, especially (but not necessarily) if the backhaul connection aggregates traffic from multiple access nodes or cells. Due to backhaul congestion and/or other issues, some of the IP packets that the access node seeks to forward into the core network to facilitate transmission a destination remote entity could be lost and therefore not make it to their destination.

When an IP packet transmitted by the UE to a remote entity fails to make it to the remote entity, the TCP protocol could cause the UE to retransmit that IP packet to the remote entity. In particular, for each packet that the UE transmits to the remote entity using the TCP protocol, the remote entity should respond to the UE with a TCP acknowledgement (ACK) within a defined retransmission time period. If a packet does not make it to the remote entity, the UE would not receive that TCP ACK within the retransmission time period, and therefore the UE would engage in retransmission of the packet to the remote entity.

Unfortunately, the process of the UE retransmitting a packet due to such packet loss can contribute to load on the air interface, at the UE's serving access node, and elsewhere.

The present disclosure provides a mechanism that may help to address this issue. In accordance with the disclosure, an access node will use the level of uplink packet loss on its backhaul interface as a basis to dynamically control the size of transport blocks that the access node's served UE(s) will transmit over the air to the access node. For instance, when the level of uplink packet loss is relatively high, the access node could take action to suppress the size of transport blocks, such as by causing UEs to scale down the size of their transport blocks from what the standard mapping would specify for the MCS and quantity of PRBs allocated by the access node. This reduced TBS would could correlate with less user-plane data passing over the air and being processed by the access node per scheduled air-interface transmission. Therefore, when UEs engage in TCP retransmission due to backhaul packet loss, each TCP retransmission may present less of a load issue per scheduled air-interface transmission.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Referring to the drawings, as noted above, FIG. 1 is a simplified block diagram of an example wireless communication system in which various disclosed features could be implemented. It should be understood that variations of this and other disclosed arrangements and operations are possible as well. For instance, various described entities, connections, functions, and other elements could be added, omitted, distributed, re-located, re-ordered, combined, or changed in other ways. Further, operations described as being carried out by one or more entities could be carried out by suitably configured components, such as by one or more processing units executing program instructions, among other possibilities.

Figure 1:
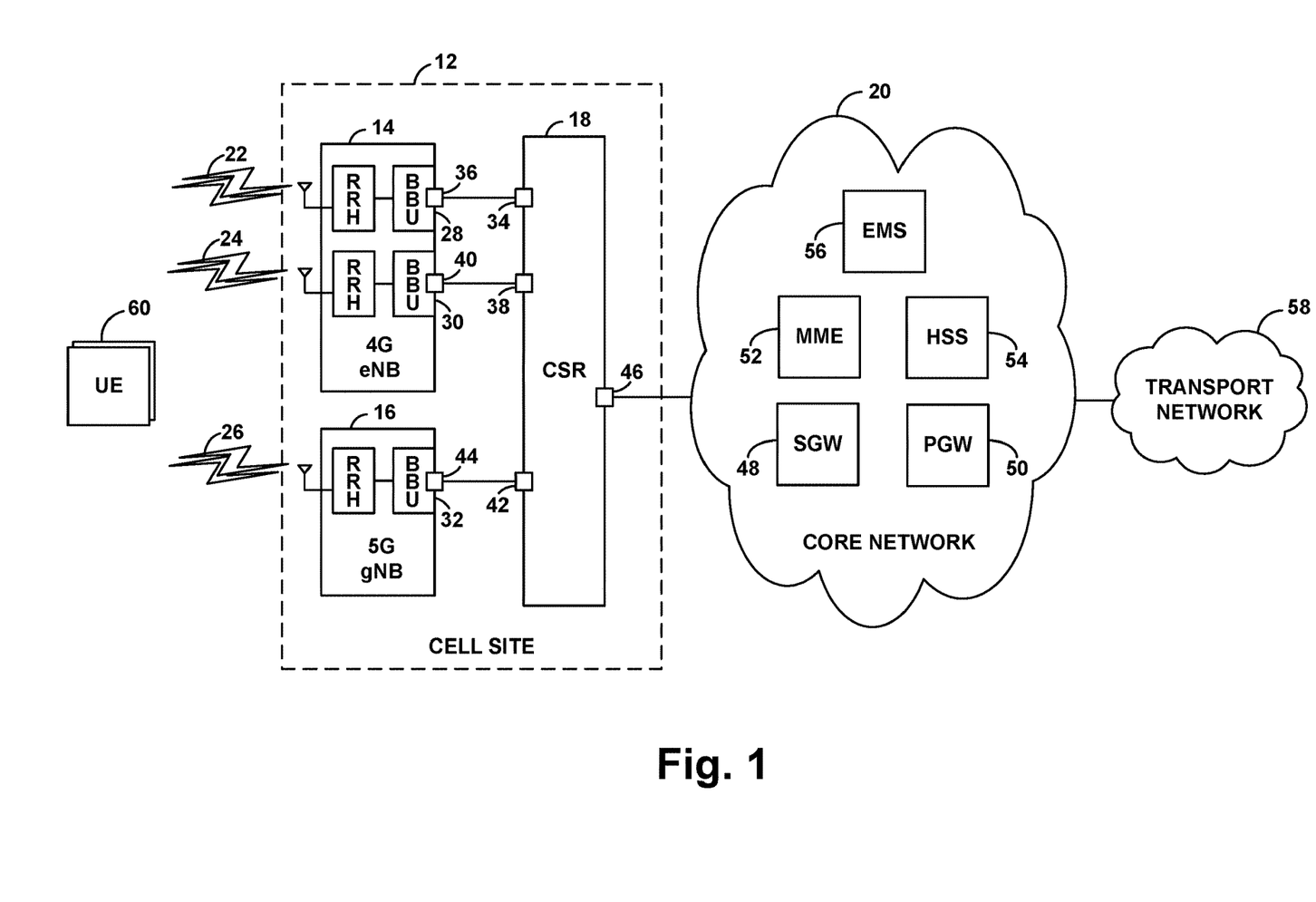
FIG. 1 is a simplified block diagram of an example wireless communication system in which aspects of the present disclosure can be implemented.

As shown n FIG. 1, the example system includes a cell site 12 having two example access nodes 14, 16, and having a cell site router (CSR) 18 that provides backhaul connectivity between the example access nodes 14, 16 and an example core network 20 that provides connectivity with a transport network 58.

Access nodes 14, 16 could each be a macro access node of the type configured to provide a wide range of coverage or could take other forms, such as a small cell access node, a repeater, a femtocell access node, or the like, possibly configured to provide a smaller range of coverage. Further, each access node could be configured to operate in accordance with a respective RAT, such as one of those noted above. For instance, as shown, access node 14 might be a 4G evolved Node-B (eNB) configured to operate in accordance with 4G LTE, and access node 16 might be a 5G next generation Node-B (gNB) configured to operate in accordance with 5G NR. Alternatively, the access nodes could be configured to operate in accordance with other RATs and possibly in accordance with the same RAT as each other.

In addition, each access node could be configured to provide one or more cells, each defined on a respective carrier in a given frequency band and having a given duplex mode (e.g., FDD or TDD). In the example shown, for instance, access node 14 is configured to provide one or more cells 22, which might be defined in given frequency band, and one or more other cells 24, which might be defined in another frequency band. And access node 16 is configured to provide one or more cells 26, which might be defined in one of those frequency bands or in another frequency band.

The air interface of each such cell could be structured as described above by way of example, being divided over time into frames, subframes, timeslots, and symbol time segments, and over frequency into subcarriers, thus defining the array of air-interface resource elements grouped into PRBs allocable by the access node as noted above, for use to carry data to or from served UEs. The air-interfaces under different RATs, however, might differ from each other in various ways now known or later developed, such as with different subcarrier spacing, different symbol time segment length, and/or use of different MIMO technologies, among other possibilities.

In an example implementation as shown in FIG. 1, each of the access nodes 14, 16 could include at least one antenna structure, at least one remote radio head (RRH), and at least one BBU. For example, the cell site 12 could include a massive-MIMO antenna array shared by the access nodes, or each access node could have its own respective antenna array. Each RRH of an access node could then include a radio and other RF circuitry defining an RF transmit chain and an RF receive chain, with components such as power amplifiers, filters, and digital-analog converters, to facilitate RF communication via the access node's antenna structure. And each BBU of an access node could include processing components to facilitate baseband signal processing, general access node control, and backhaul communication.

With this arrangement, each BBU could be configured to handle communications on a given frequency band. Therefore, if access node 14 is configured to provide service on at least two different frequency bands, then access node 14 could include at least two BBUs 28, 30. BBU 28 could be configured to handle communications on the one or more cells 22 of one frequency band, and BBU 30 could be configured to handle communications on the one or more cells 24 of another frequency band. And if access node 16 is configured to provide service on a single frequency band, then access node 16 could include a single BBU 32 configured to handle communications on the one or more cells 26 of that single frequency band.

In a representative arrangement, the example cell site 12 could include an antenna tower and an equipment room or cabinet at the base of the antenna tower. Each RRH of an access node could be mounted on the tower. And an associated BBU of the access node could be housed in the equipment room or cabinet and connected with the RRH by a multi-fiber cable. Further, the equipment room or cabinet could also house the cell site's CSR 18, which as noted above could provide connectivity with the core network 20.

The CSR 18 could be a network router, configured to forward data packets from point to point, between the cell site 12 and entities on the core network 20, and between the access nodes 14, 16, among other possibilities. As such, the CSR 18 could include multiple ports supporting physical and logical network connections with other devices.

As shown in FIG. 1, for instance, a port 34 of the CSR 18 could be connected by a network cable with a port 36 of BBU 28 of access node 14, another port 38 of the CSR 18 could be connected by a network cable with a port 40 of BBU 30 of access node 14, and yet another port 42 of the CSR 18 could be connected by a network cable with a port 44 of BBU 32 of access node 16. Further, another port 46 of the CSR 18 could be connected by a network cable with the core network 20 (e.g., with an upstream router, switch, or gateway of the core network 20).

Without limitation, this arrangement thereby defines an example backhaul interface or backhaul communication path through which packet data could flow from an access node into the core network 20. Further, the arrangement defines a separate such backhaul interface respectively for each BBU and thus respectively for each frequency band on which an access node operates. For instance, for BBU 28 and the associated frequency band of access node 14, the backhaul interface could encompass (i) port 36 at the BBU 28 and associated routing logic of the BBU 28, (ii) the network connection between port 36 and port 34 of the CSR 18, (iii) routing circuitry in the CSR 18, and (iv) port 46 of the CSR 18.

Various points in this example backhaul interface could be a cause for packet loss as packets en route from served UEs to remote entities. For example, if BBU 28 aggregates uplink communications as to multiple cells provided by access node 14, the BBU's port 36 might be a bottleneck for those communications, causing the BBU 28 to drop packets that await output via port 36 for too long. As another example, as the CSR 18 in the example arrangement aggregates uplink communications from multiple access nodes, the CSR's port 46 might be a bottleneck for those communications, causing the CSR 18 to drop packets that await output via port 46 for too long. Further, numerous other causes for packet loss on an access node's backhaul interface could be possible as well.

Continuing with reference to FIG. 1, the core network 20 could be a packet-switched network, such as an Evolved Packet Core (EPC) network or Next Generation Core (NGC) network, supporting Internet Protocol (IP) communication and virtual packet tunnel interfaces between network nodes. In the non-limiting example shown, the core network 20 includes a serving gateway (SGW) 48, a packet data network gateway (PGW) 50, a mobility management entity (MME) 52, a home subscriber server (HSS) 54, and an element management system (EMS) 56, although other arrangements are possible as well.

With this core-network arrangement, each BBU could communicate with the SGW 48, the SGW 48 could communicate with the PGW 50, and the PGW 50 could provide connectivity with the transport network 58, such as the Internet. Further, each BBU could communicate with the MME 52, and the MME 52 could communicate with the SGW 48, so that the MME 52 could coordinate setup of bearers for UEs to engage in packet-data communication. Still further, the HSS 54 could store or otherwise have access to UE profile records, which could specify service-subscription plans, UE configurations, and/or other such UE capability information. And the EMS 56 could operate as a central repository of operational data for the wireless communication network and to control and manage operation of various network elements.

FIG. 1 also depicts various example UEs 60 that may from time to time be within coverage of cell site 12 and may be served by the access nodes 14, 16. Each such UE could take any of the forms noted above, among other possibilities, and might be configured to support service according to one or more applicable RATs. For instance, a UE may have a 4G LTE radio and associated RF circuitry and logic, and/or a 5G NR radio and associated RF circuitry and logic. In addition, if a UE is configured to support both 4G service and 5G service, the UE might also be configured to support 4G-5G dual connectivity, such as EUTRA-NR Dual Connectivity (EN-DC).

When such a UE enters into coverage of the cell site 12, the UE could initially scan for coverage on a preferred RAT on one or more carriers and could thereby discover threshold strong coverage of at least one cell, such as one of cells 22, 24, 26. And the UE could then engage in random-access and RRC signaling with the access node that provides the cell, to establish an RRC connection defining a logical air-interface connection between the UE and the access node. And the access node could establish in data storage a context record for the UE, indicating the state of the UE's connection.

Further, if the UE is not already registered for service with the core network, the UE could engage in attach signaling with the MME 52 through the UE's established air-interface connection, and the MME 52 could coordinate setup for the UE of at least one user-plane bearer. For instance, the MME 52 could engage in signaling with the UE's serving access node and the SGW 48 to coordinate setup for the UE of an S1-U packet tunnel between the access node and the SGW 48, the SGW 48 could responsively engage in signaling with the PGW 50 to set up for the UE a corresponding S5 packet tunnel between the SGW 48 and the PGW 50, and the access node could also responsively engage in signaling with the UE to set up a corresponding data radio bearer (DRB) over the air between the access node and the UE.

In addition, in relation to this attachment process, the PGW 50 or an associated server could assign to the UE an IP address that the UE could use for communication on the transport network 58, and this IP address assignment could pass to the UE in responsive signaling through the MME and the access node.

And also in relation to the attachment process, the access node could obtain service profile data of the UE and could store the data in the UE context record. For instance, the MME 52 could obtain this data from the HSS 54 and could provide the data to the access node. Or the UE itself might report this data to the access node.

Once the UE is so connected and attached, the access node could then serve the UE as discussed above.

As to uplink communication in particular, as the UE has TCP/IP packets to transmit, the UE could buffer the packet data and transmit to the access node a scheduling request with a BSR indicating the quantity of data buffered. Considering the UE's BSR and the availability of PRBs in the UE's serving cell, the access node could then decide how many uplink PRBs to allocate to the UE to accommodate transmission of at least a portion of the UE's buffered data. Further, the access node could determine based on CQI reported by the UE what MCS should be used for the UE's uplink transmission. And the access node could transmit to the UE a DCI that designates the allocated uplink PRBs and the MCS.

As noted above, the UE in this situation could use one or more standard mapping tables to determine what size transport block the UE should transmit in the designated PRBs using the designated MCS. As indicated above, one such mapping table could correlate each of a range of possible MCSs respectively with an associated TBS index number. And another mapping table could then correlate each such TBS index number with various different TBSs depending on the number of PRBs allocated, specifying larger TBSs for greater numbers of PRBs. Thus, the UE could apply that example mapping data to determine how many bits of data to transmit as a transmit block in uplink PRB(s) allocated by the access node.

As noted above, the present disclosure provides for taking into account uplink backhaul packet loss as a further basis to control what TBS a UE will use for uplink transmission to the UE's serving access node. In particular, as noted above, if and when an access node's backhaul interface has a threshold high extent of uplink packet-loss, the access node could take action to suppress the size of transport blocks that one or more of served UEs will use for uplink transmission to the access node. For instance, while standard mapping data or other logic may call for use of a particular TBS, the access node could take action to scale down that TBS, so as to reduce the extent of data transmitted per scheduled transmission.

An access node could carry out this process on a per cell basis, on a per frequency-band basis, or on another basis, perhaps generally for the access node. In the arrangement of FIG. 1, for instance, access node 14 could carry out this process generally for all cells served by BBU 28, or perhaps for a specific such cell, among other possibilities.

Considering a specific cell 22 for instance, access node 14 could monitor the level of uplink packet loss on the backhaul interface that the access node 14 uses for user-plane and control-plane communication as to service in cell 22. For instance, the access node 14 could monitor as the level of uplink backhaul packet loss a rate of such packet loss on average over time, such as over a recent sliding window of time. The rate of uplink backhaul packet loss could define what percentage of uplink packets that access node 14 has for uplink transmission do not successfully make it to their destination. For instance, at a cell 22, this could be what percentage of packets that BBU 28 has for uplink transmission do not successfully make it to their destination.

Access node 14 could determine and track this rate of uplink backhaul packet loss based on various measurements, reports, and/or observations.

For example, the access node 14 itself could keep track of the rate at which BBU 28 drops packets that the BBU 28 had buffered for uplink transmission through port 36. And the CSR 18 could keep track of the rate at which the CSR 18 drops packets that the CSR 18 had received from BBU 28 and had buffered for uplink transmission through port 46, and the CSR 18 could report that packet drop rate to the access node 14 through periodic or other signaling to the BBU 28. Access node 14 could thus aggregate these packet drop rates to compute a representative uplink backhaul packet loss rate.

As another example, the access node 14 could engage in deep packet inspection (DPI) to track the extent to which TCP ACKs do not arrive for outbound TCP packets from UEs served by the access node. The access node could perform this tracking on a per TCP-sequence-number basis for instance, deeming a packet loss to occur upon detecting the absence of an associated TCP ACK. Further, the access node may also be able to perform DPI to detect uplink backhaul packet loss by detecting retransmission of TCP packets, e.g., detecting that uplink packets from a given UE have the same TCP sequence number as each other.

When the access node is going to schedule uplink air-interface transmission from a UE, or in advance of that time, the access node could then use the most recent such tracked rate of uplink backhaul packet loss as a basis to control what TBS the UE will use for the transmission, e.g., how many bits of data the UE will transmit as a transport block to the access node.

For instance, the access node could determine whether the rate of uplink backhaul packet loss is at least as high as a predefined threshold level, which could be set by engineering design for present purposes. And based on that determination, the access node could control whether or not to suppress the TBS that the UE will use for the transmission.

In particular, if the access node determines that the rate of uplink backhaul packet loss is not at least as high as the predefined threshold level, then, based at least on that determination, the access node could allow the UE to use a standard TBS for the transmission, perhaps a TBS that the UE determines by applying one or more standard mapping tables as noted above. In that case, the access node may take no action to suppress the TBS that the UE would use for the transmission. Whereas, if the access node determines that the rate of uplink backhaul packet loss is at least as high as the predefined threshold level, then, based at least on that determination, the access node could take action to suppress the TBS that the UE will use for the transmission.

In practice, the access node's action to suppress the TBS could take various forms.

By way of example, when the access node sends a DCI to the UE to schedule the uplink transmission, the access node could include in the DCI a directive for the UE to scale down the TBS that the UE would determine from one or more standard mapping tables. For instance, this directive could be a codeword to which the UE is configured to respond accordingly and may also specify a scaling factor, such as a percentage reduction of the standard TBS. Thus, in response to this directive, if the UE would normally determine a particular TBS based on the standard mapping tables, the UE could then scale down that TBS by the indicated scaling factor or by a predefined scaling factor and could accordingly apply the scaled down TBS rather than the standard TBS.

As another example, when the access node sends a DCI to the UE to schedule the uplink transmission, the access node could include in the DCI an indication of what scaled down TBS the UE should use for the transmission. For instance, the access node could refer to the standard mapping tables to determine a TBS that the UE would normally apply, the access node could itself scale down that TBS, and the access node could specify that scaled down TBS in the access node's DCI to the UE. Upon receipt of that DCI, the UE could then use that specified TBS rather than the standard TBS.

Further, if the access node decides to suppress the TBS that the UE will use for the transmission, the access node could decide on an extent of such suppression, such as how much to scale down the TBS, based on the how high the rate of uplink backhaul packet loss is. For instance, the access node could decide to scale down the TBS to a greater extent for higher rates of threshold high uplink backhaul packet loss, and to a lesser extent for lower rates of threshold high uplink backhaul packet loss. And the access node could direct the UE accordingly.

Other mechanisms to correlate the extent of uplink backhaul packet loss to a reduction in TBS for air interface transmission could be possible as well.

Figure 2:
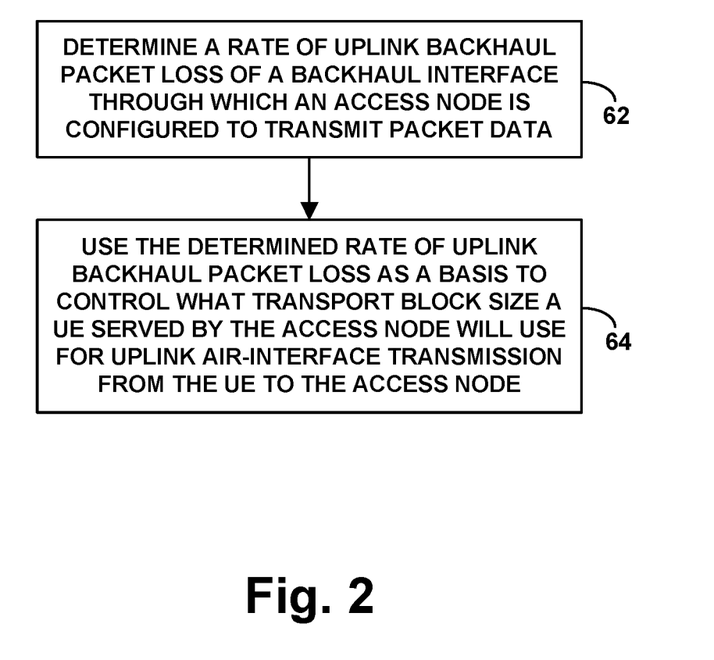
FIG. 2 is a flow chart depicting an example method in accordance with the disclosure.

FIG. 2 is next a flow chart illustrating an example method that could be carried out in accordance with the present disclosure to control the TBS that a UE will use for uplink air-interface transmission from the UE to an access node serving the UE, where the TBS defines a quantity of data that the UE will provide in the uplink air-interface transmission, and where the access node has a backhaul interface through which the access node is configured to transmit packet data. In an example implementation, this method could be carried out by the access node. Alternatively, the method could be carried out by one or more other entities, such as the EMS 56 or another entity interworking with the access node.

As shown in FIG. 2, at block 62, the method includes determining a rate of uplink backhaul packet loss of the backhaul interface. And at block 64, the method includes using the determined rate of uplink backhaul packet loss as a basis to control what TBS the UE will use for the uplink air-interface transmission.

In line with the discussion above, in this method, the act of determining the rate of uplink backhaul packet loss of the backhaul interface could involve the access node tracking a rate at which the access node drops packets that the access node has buffered for uplink transmission on the backhaul interface. Further or alternatively, the act of determining the rate of uplink backhaul packet loss of the backhaul interface could involve the access node receiving from a cell site router a report of a rate at which the cell site router drops packets that the cell site router has buffered for uplink transmission on the backhaul interface. And still further or alternatively, the act of determining the rate of uplink backhaul packet loss of the backhaul interface could involve performing DPI to track an extent of TCP uplink transmission failure on the backhaul interface.

As further discussed above, the UE in this method may normally use a standard TBS for the uplink air-interface transmission, in which case using the determined rate of uplink backhaul packet loss as a basis to control what TBS the UE will use for the uplink air-interface transmission could involve (i) the access node making a determination of whether the determined rate of uplink backhaul packet loss of the backhaul interface is at least as high as a predefined threshold level and (ii) based on the determination, the access node controlling whether or not to suppress the TBS from the standard TBS to a scaled down TBS.

Further, as discussed above, the act of the access node controlling, based on the determination, whether or not to suppress the TBS from the standard TBS to a scaled down TBS could involve (i) if the determination is negative, then, based at least on the determination, the access node allowing the UE to use the standard TBS for the uplink air-interface transmission rather than suppressing the TBS and (ii) if the determination is affirmative, then, based at least on the determination, the access node taking action to suppress the TBS.

And as discussed above, the action that the access node takes in the latter instance could take various forms. For instance, the access node could transmit to the UE a directive to which the UE is configured to respond by scaling down the TBS that the UE will use for the uplink air-interface transmission. Alternatively or additionally, the access node could transmit to the UE an indication of a scaled down TBS that the UE should use, instead of the standard TBS, for the uplink air-interface transmission. And still further, taking action to suppress the TBS could involve taking action to suppress the TBS to an extent corresponding with how high the determined rate of uplink backhaul packet loss is.

Figure 3:
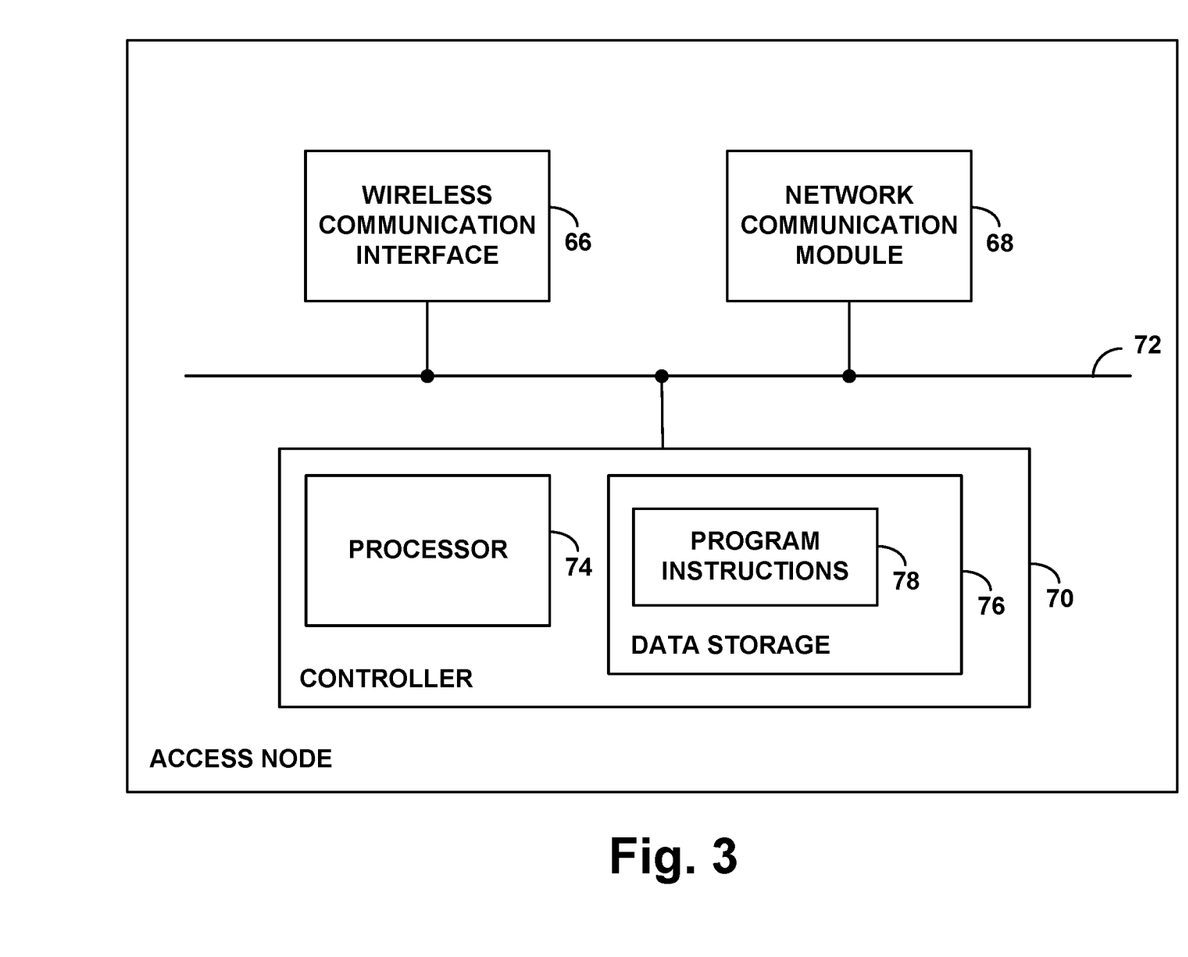
FIG. 3 is a simplified block diagram of an example access node operable in accordance with the disclosure.

FIG. 3 is next a simplified block diagram of an example access node that could be configured to carry out various features described herein. As shown in FIG. 3, the example access node includes a wireless communication interface 66, a network communication module 68, and a controller 70, all of which could be integrated together and/or communicatively linked together by a system bus, network, or other connection mechanism 72.

In an example implementation, the wireless communication interface 66 could comprise an antenna structure, which could be tower mounted or could take other forms, and associated components such as a power amplifier and a wireless transceiver, so as to facilitate providing a coverage area defining an air interface through which the access node could engage in air-interface communication with a UE when the UE is served by the access node. And the network communication module 68 could comprise a wired or wireless communication module, such as an Ethernet network communication module and associated logic, through which the access node could engage in backhaul communication on a backhaul communication interface.

Further, the controller 70 could be configured to carry out various operations described herein, such as those described above in connection with FIG. 2. For instance, as shown, the controller could include a processor 74, such as one or more processing units (e.g., one or more general purpose processors and/or specialized processors), and a non-transitory computer readable-medium (e.g., one or more volatile and/or non-volatile storage components (e.g., magnetic, optical, or flash storage, necessarily non-transitory)) 76 storing program instructions 78 executable by the processor 74 to carry out those operations (e.g., to cause the access node to carry out the operations).

Various other features discussed herein can be implemented in this context as well, and vice versa.

Figure 4:
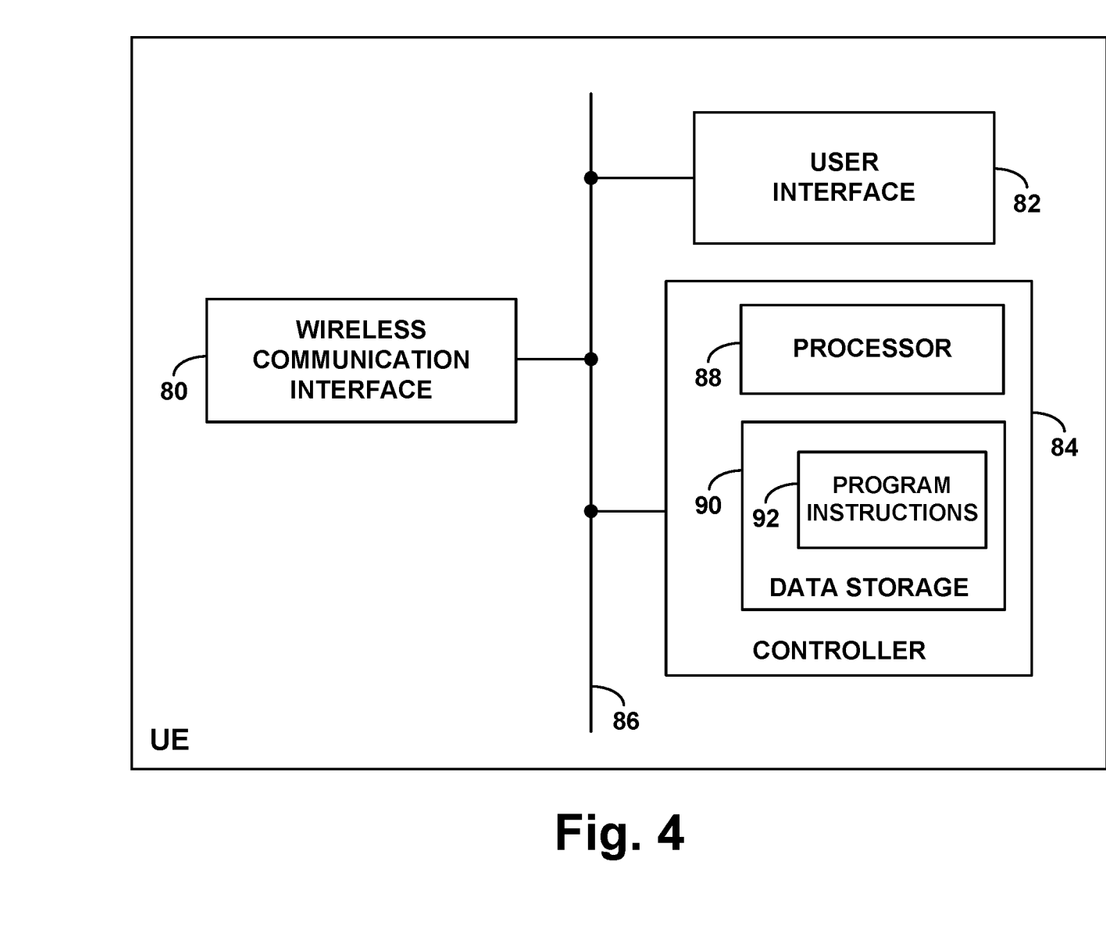
FIG. 4 is a simplified block diagram of an example UE operable in accordance with the disclosure.

Finally, FIG. 4 is a simplified block diagram of an example UE that could be configured to operate in accordance with the present disclosure. As shown in FIG. 4, the example UE includes a wireless communication interface 80, a user interface 82, and a controller 84, which could likewise be integrated together and/or communicatively linked together by a system bus, network, or other connection mechanism 86.

The wireless communication interface 80 could operate to support and thus facilitate air-interface communication with an access node and packet-data communication with remote entities, as discussed above. As such, the wireless communication interface 80 could include a radio, a power amplifier, and one or more antenna structures.

The user interface 82, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

And the controller 84, which could be integrated with the wireless communication interface 80 (e.g., on a common chipset) or provided in another manner, could operate to carry out or cause the UE to carry out various operations described herein, such as using a standard or suppressed TBS as discussed above. For instance, the controller 84 could include a processor 88, such as one or more processing units (e.g., one or more general purpose processors and/or specialized processors), and a non-transitory computer readable-medium (e.g., one or more volatile and/or non-volatile storage components (e.g., magnetic, optical, or flash storage, necessarily non-transitory)) 90 storing program instructions 92 executable by the processor 88 to carry out those operations.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to control transport block size (TBS) that a user equipment device (UE) will use for uplink air-interface transmission from the UE to an access node serving the UE, wherein the TBS defines a quantity of data that the UE will provide in the uplink air-interface transmission, and wherein the access node has a backhaul interface through which the access node is configured to transmit packet data over a backhaul to a core network, the method comprising:
   determining a rate of uplink backhaul packet loss of the backhaul interface; and
   using the determined rate of uplink backhaul packet loss as a basis to control what TBS the UE will use for the uplink air-interface transmission,
   wherein the UE and the backhaul interface are separate and distinct from each other.

2. The method of claim 1, wherein determining the rate of uplink backhaul packet loss of the backhaul interface comprises the access node tracking a rate at which the access node drops packets that the access node has buffered for uplink transmission on the backhaul interface.

3. The method of claim 1, wherein determining the rate of uplink backhaul packet loss of the backhaul interface comprises the access node receiving from a cell site router a report of a rate at which the cell site router drops packets that the cell site router has buffered for uplink transmission on the backhaul interface.

4. The method of claim 1, wherein determining the rate of uplink backhaul packet loss of the backhaul interface comprises performing deep packet inspection to track an extent of Transmission Control Protocol (TCP) uplink transmission failure on the backhaul interface.

5. The method of claim 1, wherein the UE would normally use a standard TBS for the uplink air-interface transmission, and wherein using the determined rate of uplink backhaul packet loss as a basis to control what TBS the UE will use for the uplink air-interface transmission comprises:
   making a determination by the access node of whether the determined rate of uplink backhaul packet loss of the backhaul interface is at least as high as a predefined threshold level; and
   based on the determination, controlling by the access node whether or not to suppress the TBS from the standard TBS to a scaled down TBS.

6. The method of claim 5, wherein controlling by the access node, based on the determination, whether or not to suppress the TBS from the standard TBS to a scaled down TBS comprises:
   if the determination is negative, then, based at least on the determination, the access node allowing the UE to use the standard TBS for the uplink air-interface transmission rather than suppressing the TBS; and
   if the determination is affirmative, then, based at least on the determination, the access node taking action to suppress the TBS.

7. The method of claim 6, wherein taking action to suppress the TBS comprises transmitting by the access node to the UE a directive to which the UE is configured to respond by scaling down the TBS that the UE will use for the uplink air-interface transmission.

8. The method of claim 6, wherein taking action to suppress the TBS comprises transmitting by the access node an indication of a scaled down TBS that the UE should use, instead of the standard TBS, for the uplink air-interface transmission.

9. The method of claim 6, wherein taking action to suppress the TBS comprises taking action to suppress the TBS to an extent corresponding with how high the determined rate of uplink backhaul packet loss is.

10. The method of claim 1, wherein the method is carried out by the access node.

11. An access node comprising:
   a wireless communication interface including an antenna structure through which to engage wireless communication with a user equipment device (UE) when the UE is served by the access node;
   a network communication module through which to engage in backhaul communication over a backhaul on a backhaul interface with a core network; and
   a controller configured to carry out operations to control transport block size (TBS) that the UE will use for uplink air-interface transmission from the UE to the access node, wherein the TBS defines a quantity of data that the UE will provide in the uplink air-interface transmission, wherein the operations include (i) determining a rate of uplink backhaul packet loss of the backhaul interface and (ii) using the determined rate of uplink backhaul packet loss as a basis to control what TBS the UE will use for the uplink air-interface transmission, wherein the UE and the backhaul interface are separate and distinct from each other.

12. The access node of claim 11, wherein the controller comprises a processor, non-transitory data storage, and program instructions stored in the non-transitory data storage and executable by the processor to carry out the operations.

13. The access node of claim 11, wherein determining the rate of uplink backhaul packet loss of the backhaul interface comprises tracking a rate at which the access node drops packets that the access node has buffered for uplink transmission on the backhaul interface.

14. The access node of claim 11, wherein determining the rate of uplink backhaul packet loss of the backhaul interface comprises receiving from a cell site router a report of a rate at which the cell site router drops packets that the cell site router has buffered for uplink transmission on the backhaul interface.

15. The access node of claim 11, wherein determining the rate of uplink backhaul packet loss of the backhaul interface comprises performing deep packet inspection to track an extent of Transmission Control Protocol (TCP) uplink transmission failure on the backhaul interface.

16. The access node of claim 11, wherein the UE would normally use a standard TBS for the uplink air-interface transmission, and wherein using the determined rate of uplink backhaul packet loss as a basis to control what TBS the UE will use for the uplink air-interface transmission comprises:

making a determination of whether the determined rate of uplink backhaul packet loss of the backhaul interface is at least as high as a predefined threshold level; and based on the determination, controlling whether or not to suppress the TBS from the standard TBS to a scaled down TBS.

17. The access node of claim 16, wherein controlling, based on the determination, whether or not to suppress the TBS from the standard TBS to a scaled down TBS comprises:

if the determination is negative, then, based at least on the determination, allowing the UE to use the standard TBS for the uplink air-interface transmission rather than suppressing the TBS; and if the determination is affirmative, then, based at least on the determination, taking action to suppress the TBS.

18. The access node of claim 17, wherein the action comprises at least one operation selected from the group consisting of (i) transmitting to the UE a directive to which the UE is configured to respond by scaling down the TBS that the UE will use for the uplink air-interface transmission and (ii) transmitting to the UE an indication of a scaled down TBS that the UE should use, instead of the standard TBS, for the uplink air-interface transmission.

19. The access node of claim 17, wherein taking action to suppress the TBS comprises taking action to suppress the TBS to an extent corresponding to how high the determined rate of uplink backhaul packet loss is.

20. A non-transitory computer-readable medium holding program instructions executable by a processor to carry out operations for controlling transport block size (TBS) that a UE served by an access node will use for uplink air-interface transmission from the UE to the access node, wherein the TBS defines a quantity of data that the UE will provide in the uplink air-interface transmission, wherein the access node has a backhaul interface through which the access node is configured to transmit packet data over a backhaul to a core network, and wherein the operations include:

determining a rate of uplink backhaul packet loss of the backhaul interface; and using the determined rate of uplink backhaul packet loss as a basis to control what TBS the UE will use for the uplink air-interface transmission, wherein the UE and the backhaul interface are separate and distinct from each other.

* * * * *